United States Patent
Charters et al.

(10) Patent No.: US 10,999,363 B2
(45) Date of Patent: May 4, 2021

(54) CONTENT HOSTING IN A MOBILE AD HOC NETWORK

(71) Applicant: International Business Machines Corporation, Armonk, NY (US)

(72) Inventors: Graham C. Charters, Southampton (GB); Bret W. Dixon, South Perth (AU); Benjamin T. Horwood, North Perth (AU); Alexander H. Poga, Peppermint Grove (AU); Mark A. Shewell, Perth (AU)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 15/077,223

(22) Filed: Mar. 22, 2016

(65) Prior Publication Data

US 2017/0279878 A1    Sep. 28, 2017

(51) Int. Cl.
| | |
|---|---|
| *H04L 29/08* | (2006.01) |
| *H04L 12/24* | (2006.01) |
| *H04W 84/18* | (2009.01) |
| *H04W 4/18* | (2009.01) |
| *H04W 24/02* | (2009.01) |
| *H04W 72/04* | (2009.01) |
| *H04W 88/02* | (2009.01) |

(52) U.S. Cl.
CPC ............ *H04L 67/104* (2013.01); *H04L 41/22* (2013.01); *H04L 67/1076* (2013.01); *H04L 67/14* (2013.01); *H04L 67/20* (2013.01); *H04W 4/18* (2013.01); *H04W 24/02* (2013.01); *H04W 72/048* (2013.01); *H04W 84/18* (2013.01); *H04W 88/02* (2013.01)

(58) Field of Classification Search
CPC ....... H04L 67/104; H04L 67/14; H04L 67/20; H04L 41/22; H04W 24/02
See application file for complete search history.

(56) References Cited

U.S. PATENT DOCUMENTS

| | | |
|---|---|---|
| 8,340,690 B2 | 12/2012 | Wong et al. |
| 8,769,610 B1 | 7/2014 | Giguiere et al. |
| 9,100,989 B2 | 8/2015 | Ray et al. |

(Continued)

FOREIGN PATENT DOCUMENTS

WO    2005107218 A1    11/2005

OTHER PUBLICATIONS

Charters et al., "Content Hosting in a Mobile Ad Hoc Network", U.S. Appl. No. 15/164,265, filed May 25, 2016, 25 pages.

(Continued)

*Primary Examiner* — Tom Y Chang
(74) *Attorney, Agent, or Firm* — Alexander G. Jochym (57) ABSTRACT

An indication to determine a device to host at least one shared content found on a first device is received. The first device is connected to a network. The network includes two or more devices. To each device of the two or more devices connected to the network, a request to host the at least one shared content found on the first device is transmitted. Responsive to transmitting the request, a response to host from at least one device of the two or more devices connected to the network is received. An optimal device of the at least one device to host the at least one shared content is determined. The at least one shared content is transmitted to the optimal device.

13 Claims, 3 Drawing Sheets

(56) References Cited

U.S. PATENT DOCUMENTS

| | | | |
|---|---|---|---|
| 2004/0203797 A1* | 10/2004 | Burr | H04L 29/06 |
| | | | 455/445 |
| 2008/0089299 A1 | 4/2008 | Lindsley et al. | |
| 2010/0274982 A1* | 10/2010 | Mehr | G06F 11/1458 |
| | | | 711/162 |
| 2015/0106437 A1* | 4/2015 | Hudson | D01D 5/423 |
| | | | 709/203 |
| 2016/0112888 A1* | 4/2016 | Hyde | H04W 24/08 |
| | | | 370/252 |
| 2017/0041296 A1 | 2/2017 | Ford et al. | |

OTHER PUBLICATIONS

Appendix P—List of IBM Patents or Patent Applications Treated as Related, 2 Pages.

Mawji et al., "Efficient content distribution for peer-to-peer overlays on mobile ad hoc networks", Journal of Advanced Research, vol. 2; Issue 3; Jul. 2011, 7 pages, <http://www.sciencedirect.com/science/article/pii/S2090123211000683>.

Qureshi et al., "An Adaptive Content Sharing Protocol for P2P Mobile Social Networks", 2010 IEEE 24th International Conference on Advanced Information Networking and Applications Workshops, © 2010 IEEE DOI 10.1109/WAINA.2010.12, pp. 413-418, <http://ieeexplore.ieee.org/ielx5/5478399/5480277/05480602.pdf?tp=&arnumber=5480602&isnumber=5480277>.

* cited by examiner

CONTENT HOSTING IN A MOBILE AD HOC NETWORK

BACKGROUND OF THE INVENTION

The present invention relates generally to the field of mobile ad hoc networks, and more particularly to content hosting in a mobile ad hoc network.

Mobile ad hoc networks (MANETs) are networks that are formed by mobile devices, such as laptops, tablets, and smartphones, that are within a certain proximity of each other. MANETs allow mobile wireless devices to connect to each other in an ad hoc manner when they come within range of each other, and disconnect when they move out of range. Each device in a MANET functions as a node (e.g., a device that is capable of functioning as a connection point, a redistribution point, and/or a communication endpoint). Because nodes in a MANET connect to each other as they come within range, the nodes any one member connects to can change as nodes move about in proximity to each other. MANETs do not require any fixed infrastructure to operate and are sometimes referred to as "infrastructureless." In other words, members of a MANET do not rely on any particular node being present in the network at any one time.

SUMMARY

Embodiments of the present invention include a method, computer program product, and system for a hosting program extending the availability of shared content. In one embodiment, an indication to determine a device to host at least one shared content found on a first device is received. The first device is connected to a network. The network includes two or more devices. To each device of the two or more devices connected to the network, a request to host the at least one shared content found on the first device is transmitted. Responsive to transmitting the request, a response to host from at least one device of the two or more devices connected to the network is received. An optimal device of the at least one device to host the at least one shared content is determined. The at least one shared content is transmitted to the optimal device.

DETAILED DESCRIPTION

Embodiments of the present invention recognize that peer-to-peer content sharing can be limited by infrastructure and the availability of content. Advantages of some embodiments of the invention include: (i) an infrastructureless network for content hosting, (ii) a temporary host to extend the availability of content, and (iii) the elimination of duplication of shared content.

Figure 1:
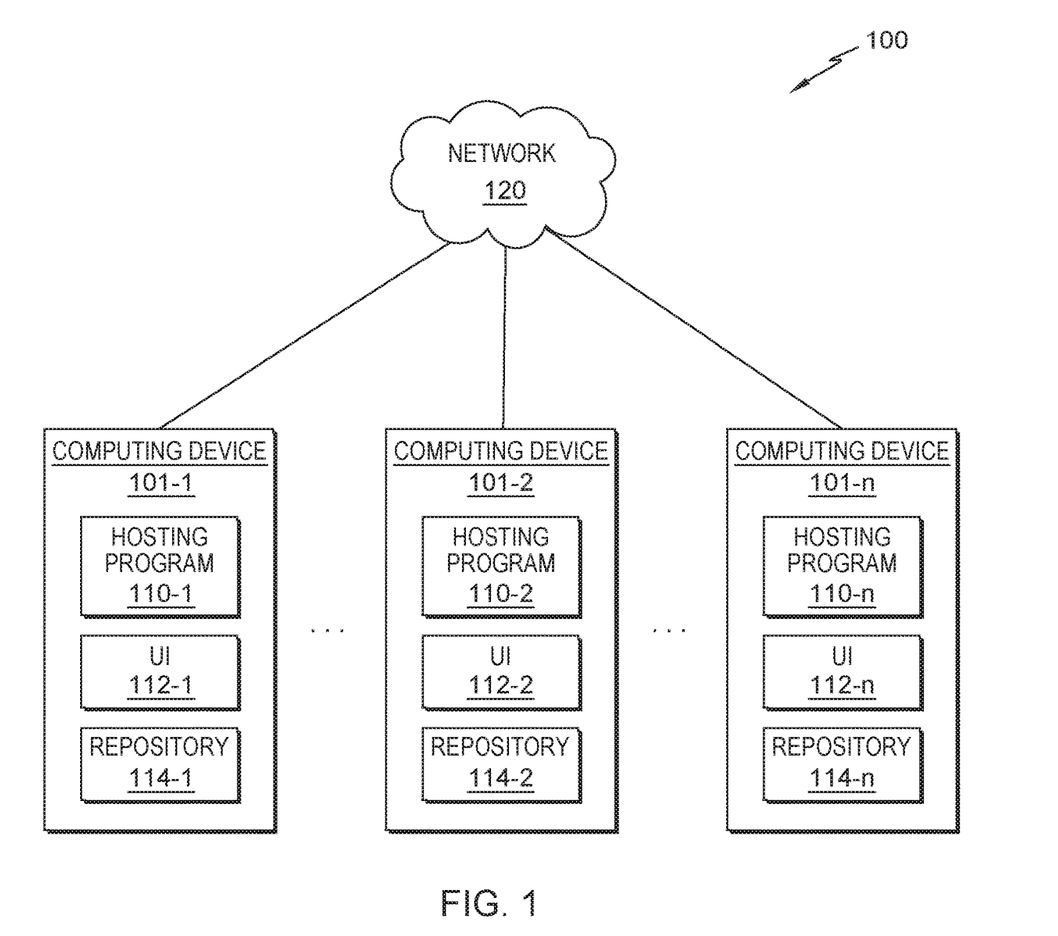
FIG. 1 a functional block diagram illustrating a computing environment, in accordance with an embodiment of the present invention.

FIG. 1 depicts a diagram of computing environment 100 in accordance with one embodiment of the present invention. FIG. 1 provides an illustration of one embodiment and does not imply any limitations with regard to the environments in which different embodiments may be implemented.

In the depicted embodiment, computing environment 100 includes computing device 101-1, computing device 101-2, and computing device 101-n interconnected over network 120. In an embodiment, computing device 101-1, computing device 101-2, and computing device 101-n are interchangeable and any can perform any or all steps of the workflow. In an embodiment, computing device 101-n denotes one or more computing devices that perform any or all of the steps of the workflow. For example, computing environment 100 may include two, ten, or fifty computing devices. Network 120 may be a local area network (LAN), a wide area network (WAN) such as the Internet, any combination thereof, or any combination of connections and protocols that will support communications between computing device 101-1, computing device 101-2, and computing device 101-n in accordance with embodiments of the present invention. In an embodiment, network 120 may be a mobile ad hoc network (MANET). In an embodiment, network 120 may include wired, wireless, or fiber optic connections. Computing environment 100 may include additional computing devices, servers, or other devices not shown.

In an embodiment, a MANET is a network that is formed by mobile devices, such as laptops, tablets, and smartphones, which are within a certain proximity of each other. In an embodiment, the MANET allows mobile wireless devices to connect to each other in an ad hoc manner when they come within range of each other, and disconnect when they move out of range. In an embodiment, each device in the MANET may function as a node. For example, a node, such as a router or cellular phone, is a device that is capable of functioning as a connection point, a redistribution point, and/or a communication endpoint. Because nodes in a MANET connect to each other as they come within range, the nodes any one member connects to may change as nodes move about in proximity to each other. In an embodiment, the MANET does not require any fixed infrastructure to operate and is sometimes referred to as "infrastructureless." In other words, members of a MANET do not rely on any particular node being present in the network at any one time.

Computing device 101-1 may be a laptop computer, tablet computer, personal digital assistant (PDA), or smart phone. In general, computing device 101-1 may be any electronic device or computing system capable of executing computer readable program instructions, and communicating with computing device 101-2 and computing device 101-n over network 120. In an embodiment, computing device 101-1 contains hosting program 110-1, user interface (UI) 112-1, and information repository 114-1. Computing device 101-1 may include components as depicted and described in further detail with respect to FIG. 4. Computing device 101-2 and computing device 101-n are substantially similar to computing device 101-1 and include substantially similar hosting program 110-2, hosting program 110-n, UI 112-2, UI 112-n, information repository 114-2, and information repository 114-n, respectively.

User interface (UI) 112-1 operates on computing device 101-1 to visualize content, such as menus and icons, and to allow a user to interact with an application accessible to computing device 101-1. In an embodiment, UI 112-1 comprises an interface to hosting program 110-1. UI 112-1 may display data received from hosting program 110-1 and send input received from a user of computing device 101-1 to hosting program 110-1. In other embodiments, UI 112-1 may comprise one or more interfaces such as, an operating system interface and/or application interfaces. In example embodiments, a user (through input via UI 112-1) of computing device 101-1 communicates with hosting program 110-1. UI 112-1 is substantially similar to UI 112-2 and UI 112-n.

A user interface, as shown by UI 112-1, is a program that provides an interface between a user and an application. A user interface refers to the information (such as graphic, text, and sound) a program presents to a user and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. The actions in GUIs are often performed through direct manipulation of the graphics elements. For example, client application may be a web browser, a database program, etc.

In an embodiment, information repository 114-1 is a repository that may be written to and/or read by hosting program 110-1. In an embodiment, information repository 114-1 stores data such as, but not limited to, the location of computing device 101-1, the amount of storage space that is available on computing device 101-1, a unique identifier that distinguishes computing device 101-1 from other computing devices, and any other data that may be used by hosting program 110-1 in an algorithm to select a host, determine content (e.g., any form of data), distribute content, or to identify and differentiate computing devices, or analyze data. In an embodiment, content is stored in information repository 114-1. In an embodiment, information repository 114-1 stores content that belongs to the user of computing device 101-n. In other embodiments, information repository 114-1 temporarily stores content belonging to another computing device 101-n. In an embodiment, the content may be any data that can be stored to computing device 101-n, in any format. For example, a picture with a .JPEG extension can be stored in information repository 114-1. In some embodiments, information repository 114-1 resides on computing device 101-1. In other embodiments, information repository 114-1 may reside on another server, or another computing device, provided that information repository 114-1 is accessible to hosting program 110-1. Information repository 114-1 is substantially similar to information repository 114-2 and information repository 114-n.

Information repository 114-1 may be implemented using any volatile or non-volatile storage media for storing information, as known in the art. For example, information repository 114-1 may be implemented with a tape library, optical library, one or more independent hard disk drives, or multiple hard disk drives in a redundant array of independent disks (RAID). Similarly, information repository 114-1 may be implemented with any suitable storage architecture known in the art, such as a relational database, an object-oriented database, or one or more tables.

In an embodiment, hosting program 110-1 operates to allow a device to host content from another device, the owning device of the content, within a mobile ad hoc network. In an embodiment, the content is a file in any format (e.g., a document, a photo, an MP3, a spreadsheet, a message, etc.). In an embodiment, hosting program 110-1 determines when a device enters or exits a MANET. In an embodiment, hosting program 110-1 recognizes individual computing devices based on an identifier that is unique to the computing device. Based on the unique identifier, hosting program 110-1 determines if a computing device is new to the network or is a device that has previously joined the network and is re-entering. If computing device 101-1 is re-entering the network, hosting program 110-1 determines if computing device 101-1 shared any content during a previous connection based on a unique identifier that is associated with shared content that identifies the computing device the content originated from.

In an embodiment, hosting program 110-1 enables computing device 101-1 to host shared content or send content to be hosted with computing device-n in network 120. In an embodiment, hosting program 110-1 uses an algorithm to select a host computing device to host shared content. In an embodiment, hosting program 110-1 sends requests to computing device 101-n and receives responses from computing device 101-n. In an embodiment, hosting program 110-1 removes the shared content computing device 101-n is hosting upon of the computing device that is the owner of the content re-joining network 120. In an embodiment, when hosting program 110-1 removes the shared content of computing device 101-1 from computing device 101-n, computing device 101-1 again hosts the content that was hosted by computing device 101-n. In an embodiment, hosting program 110-1 may perform any or all steps of the workflow. In an embodiment, hosting program 110-1, hosting program 110-2, and hosting program 110-n have the similar function and any can perform any or all steps of the workflow or in conjunction with one another.

Figure 2:
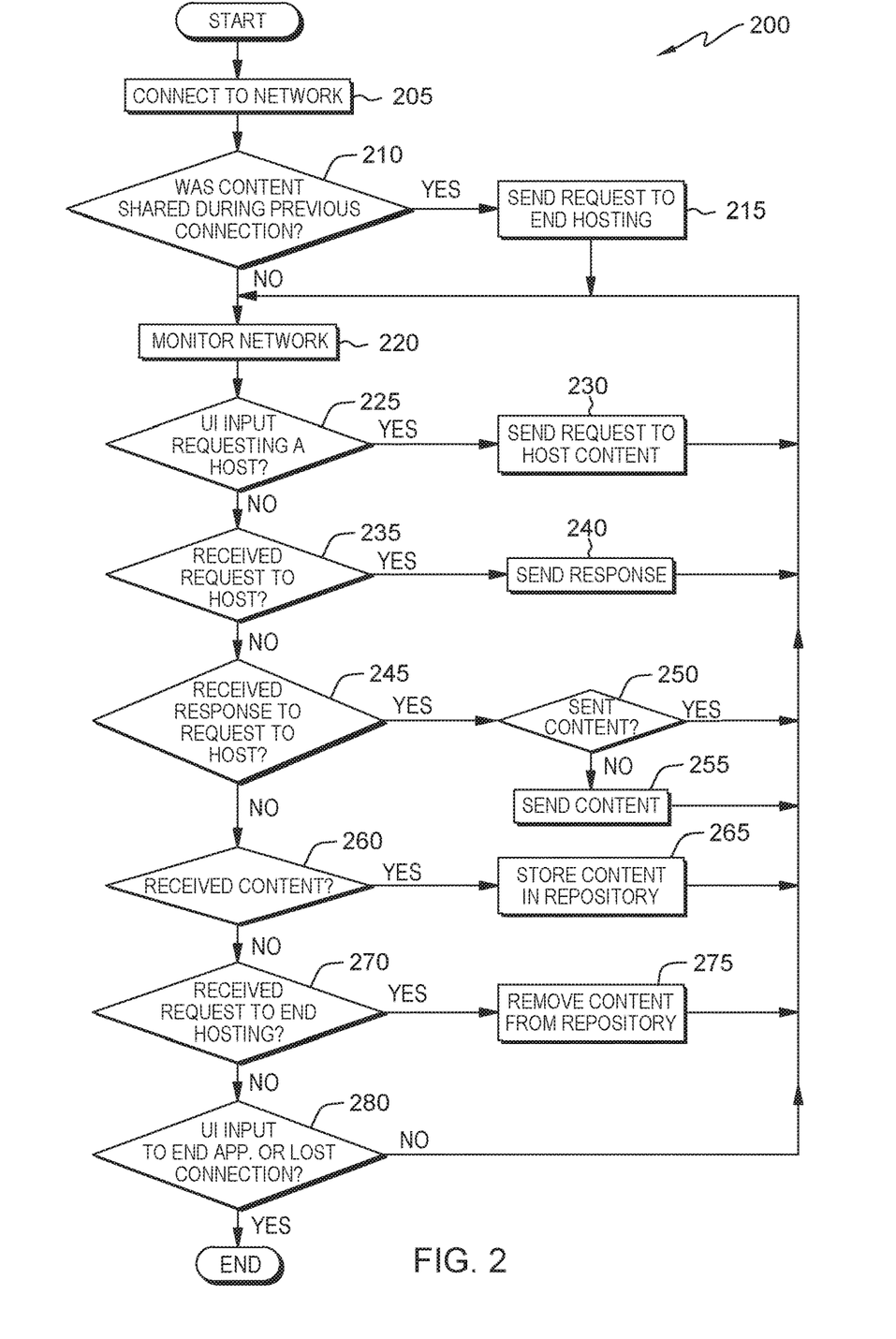
FIG. 2 a flowchart of operational steps of a hosting program extending the availability of shared content.

FIG. 2 depicts a flowchart of operational steps 200 of hosting program 110-1 executing within the computing environment of FIG. 1, in accordance with an embodiment of the present invention. Hosting program 110-1 operates to locate a host computing device to host content of another (owning) computing device and then distribute the content of the owning computing device to the host computing device. In an embodiment, the steps of the workflow are performed by any hosting program 110-n on any of the computing devices 101-n. Alternatively, steps of the workflow can be performed by any other program while working with hosting program 110-n. In an embodiment, operational steps 200 may be performed by any or all hosting programs (i.e., hosting program 110-1, hosting program 110-2, and hosting program 110-n) on any or all of the computing devices (i.e., computing device 101-1, computing device 101-2, and computing device 101-n).

In an embodiment, a user of computing device 101-1, via UI 112-1, joins a mobile ad hoc network (MANET) (i.e., network 120). Once connected to the MANET, the user has the ability to selectively share content stored on the device of the user (i.e., computing device 101-1). If the user wants to leave the MANET but wants the shared content to remain visible or accessible to other users of the MANET, hosting program 110-1 receives input from the user indicating that the user wants hosting program 110-1 to find a device connected to network 120 to host the shared content. Once hosting program 110-1 determines a host to host the shared content of the owning device, hosting program 110-1 distributes the shared content to the determined hosting device. In another embodiment, hosting program 110-1 receives input from the hosting device to find a new host to host the shared content, if the host device wants to leave the network.

In step 205, hosting program 110-1 connects computing device 101-1 to network 120. In an embodiment, network 120 is a mobile ad hoc network (MANET). In an embodiment, hosting program 110-1 connects computing device 101-1 to network 120 via a wireless connection. For example, the wireless connection can be in the form of a Bluetooth connection or a Wi-Fi connection or any other connection that allows mobile devices to connect to each other wirelessly.

In decision block 210, hosting program 110-1 determines if computing device 101-1 shared content during a previous connection to network 120. In an embodiment, hosting program 110-1 determines if computing device 101-1 shared content during a previous connection to network 120 by searching information repository 114-1 for data that indicates content was shared during a previous connection. In an embodiment, when hosting program 110-1 shares content of computing device 101-1 with a host computing device (e.g., computing device 101-2), hosting program 110-1 retains and stores information to information repository 114-1 indicating that content of computing device 101-1 was shared with a host computing device. For example, hosting program 110-1 shared content with computing device 101-2. Computing device 101-1 leaves network 120. Computing device 101-1 returns to network 120 two hours later. Upon reentry, hosting program 110-1 searches information repository 114-1 for data that indicates content was shared during a previous connection. In another embodiment, hosting program 110-1 determines if computing device 101-1 shared content during a previous connection to network 120 by determining a unique identifier associated with computing device 101-1 and/or the shared content of computing device 101-1. For example, upon computing device 101-1 reentering network 120, hosting program 110-1 determines computing device 101-2 is hosting content of computing device 101-1 because the content computing device 101-2 is hosting has a unique identifier that is associated with computing device 101-1.

If hosting program 110-1 determines that computing device 101-1 shared content with a host during a previous connection to network 120 (decision block 210, yes branch), hosting program 110-1 broadcasts a request to end hosting (step 215). In an embodiment, hosting program 110-1 broadcasts a request to end hosting to the host computing device(s) in network 120 that are hosting the content of the owning computing device that returned to network 120. In an embodiment, communication between computing devices can be achieved using Application Programming Interfaces (APIs) applicable to the operating system of the computing device.

For example, computing device 101-1 shared content with host computing device 101-2 prior to leaving network 120. Upon computing device 101-1 reconnecting to network 120, hosting program 110-1 determines that computing device 101-1 shared content during a previous connection to network 120. Hosting program 110-1 sends a request to end hosting. Upon host computing device 101-2 receiving the request to end hosting, hosting program 110-2 removes the shared content that computing device 101-2 was hosting. In an embodiment, hosting program 110-2 removes content to prevent duplication (content that is shared simultaneously by two or more computing devices) of content in network 120.

If hosting program 110-1 determines that computing device 101-1 did not share content with a host computing device during a previous connection to network 120 (decision block 210, no branch), hosting program 110-1 monitors network (step 220). In an embodiment, hosting program 110-1 waits for UI input or network data by monitoring network 120. In an embodiment, UI input may be a request from an owning computing device (i.e., computing device 101-1) requesting a host computing device (i.e., computing device 101-2) to host the shared content of the owning computing device.

In decision block 225, hosting program 110-1 determines if hosting program 110-1 receives UI input from computing device 101-1 requesting hosting program 110-1 to locate a host computing device (i.e., computing device 101-2) to host the shared content of computing device 101-1 based on the metadata included in the received UI input. In an embodiment, the metadata may be within a header. In an embodiment, the metadata may include, but is not limited to, information about the sender (i.e., the computing device requesting a host), the size of the transmitted content (i.e., payload), and the format of the content (e.g., a file with a .pdf extension). For example, hosting program 110-1 receives UI input. Based on the metadata associated with the received input, hosting program 110-1 identifies computing device 101-1 as the sender of the input and identifies the received input as a request for hosting program 110-1 to locate a host computing device to host shared content belonging to computing device 101-1. In an embodiment, hosting program 110-1 receives the request from computing device 101-1 via touchscreen interactions. In another embodiment, hosting program 110-1 receives the request from computing device 101-1 via a voice response. In other embodiments, hosting program 110-1 receives the request from computing device 101-1 through any interaction received via UI 112-1.

If hosting program 110-1 determines that hosting program 110-1 received UI input from computing device 101-1 requesting a host computing device to host the shared content of computing device 101-1 (decision block 225, yes branch), hosting program 110-1 sends a request for a host to host content (step 230). In an embodiment, hosting program 110-1 sends a request to computing device 101-n (i.e., some or all of the computing devices connected to network 120) in network 120. In an embodiment, the request is in the background, without notifying the user(s) of computing devices within network 120. For example, hosting program 110-1 sends a request for a host to host shared content to the computing devices of network 120. Hosting program 110-1 communicates with the hosting program(s) of computing device(s) without communicating, interacting, or notifying with the user(s) of computing device-n. In another embodiment, hosting program 110-1 sends a request directly to the user(s) of computing device 101-n via the UI discussed previously. For example, hosting program 110-1 sends a request to the user(s) of potential host computing device(s) via a visual notification (e.g., a text message or a notification that appears on the screen of the computing device(s)) or an audible notification.

If hosting program 110-1 determines that hosting program 110-1 did not send input requesting a host for the shared content of computing device 101-1 (decision block 225, no branch), hosting program 110-1 determines a request from another hosting program 110-n to host the shared content of another computing device 101-n (decision block 235) was received. In an embodiment, hosting program 110-1 determines if a request to host the shared content was received based on the metadata associated with input received by hosting program 110-1. For example, hosting program 110-1 receives input. Hosting program 110-1 identifies the sender and contents of the received payload. In an embodiment, one or more computing devices (i.e., computing device 101-1 and/or computing device 101-n) within network 120 may receive the request to host the shared content.

If hosting program 110-1 receives a request to host the shared content of another computing device (decision block 235, yes branch), hosting program 110-1 sends a response (step 240). In an embodiment, hosting program 110-1 sends a response to hosting program 110-2. In an embodiment, the response by hosting program 110-1 is generated automatically. In another embodiment, the response by hosting program 110-1 is a manual (non-automatic) response. For example, hosting program 110-1 prompts the user to accept or decline the request.

If hosting program 110-1 did not receive a request to host shared content (decision block 235, no branch), hosting program 110-1 determines if a response to the request for a host was received (decision block 245). In an embodiment, hosting program 110-1 determines if hosting program 110-1 received a response from a potential host computing device (i.e., computing device 101-2 and computing device 101-*n*) by monitoring network 120 and identifying incoming input.

If hosting program 110-1 determines that a response to the request for a host was received (decision block 245, yes branch), hosting program 110-1 determines if the content was sent (decision block 250). In an embodiment, hosting program 110-1 determines if hosting program 110-1 sent the shared content of computing device 101-1 to computing device 101-*n* by looking at data stored in information repository 114-1. In an embodiment, hosting program 110-1 determines if hosting program 110-1 already shared the shared content of computing device 101-1 to computing device 101-*n* by monitoring outputs sent by hosting program 110-1 of computing device 101-1.

If hosting program 110-1 determines that the shared content was already sent (decision block 250, yes branch), processing proceeds to step 220.

If hosting program 110-1 determines that the shared content was not already sent (decision block 250, no branch), hosting program 110-1 sends the shared content to a responding computing device (i.e., the device that sent the response identified at decision block 245) (step 255). In an embodiment, hosting program 110-1 sends the shared content of computing device 101-1 to a responding host computing device 101-*n*. In an embodiment, if hosting program 110-1 receives a response from a single computing device in network 120, hosting program 110-1 selects the computing device that responded to the request for a host for the shared content of computing device 101-1 to host the content. In another embodiment, if hosting program 110-1 receives more than one responses from multiple computing devices in network 120, hosting program 110-1 selects which computing device should be the host based on various factors (e.g., average time the device stays within network 120, amount of storage space available on the computing device, the battery life of a device, and any other criterion that could affect the hosting capabilities of a computing device and/or affect the visibility of the shared content). In an embodiment, hosting program 110-1 uses an algorithm to determine which device to select as the host for the shared content based on information about each computing device provided in the response to the request to host content. The algorithm may consider information such as, but not limited to, the average length of time a computing device stays in network 120, the average time a computing device exits networks 120 (e.g., 5:00 PM), information inputted by a user, the amount of memory available on a computing device, and any other piece of information that would help determine which computing device would be the optimal host for the shared content. For example, hosting program 110-1 sends a request for a host to computing devices in network 120. Hosting program 110-1 receives a response from two computing devices at noon. Hosting program 110-1 determines that the average exit time of computing device A is 3:00 PM and the average exit time of computing device B is 5:00 PM from the content of the responses. Since computing device B typically has a later exit time, hosting program 110-1 selects computing device B to be the host of the shared content since computing device B will most likely remain in network 120 longer than computing device A. In an embodiment, the information about each device is stored in information repository 114-1. In other embodiments, the information is stored on any program or server, provided hosting program 110-1 has access to the information.

In an embodiment, hosting program 110-1 allows a user to select a host computing device to host the shared content. For example, hosting program 110-1, via UI 112-1, displays a list of computing devices in network 120 for the user of computing device 101-1. Of the three computing devices listed, computing device A, computing device B, and computing device C, the user of computing device 101-1 selects computing device B to host the shared content of computing device 101-1. In an embodiment, hosting program 110-1 displays information about each computing device hosting program 110-1 displays for the user. For example, hosting program 110-1 displays computing device A, computing device B, and computing device C and the respective average exit times of each displayed computing device. Based on the displayed average exit times of each device, the user of computing device, via UI 112-1, selects computing device B to host the shared content of computing device 101-1.

In another embodiment, hosting program 110-1 determines which host computing device to select as the host of the shared content if more than one host computing device sends a response indicating the computing device can host the content. In an embodiment, using an algorithm, hosting program 110-1 selects a host computing device in the background, without input from the user or interaction with the user. For example, hosting program 110-1 searches network 120 for a host computing device. Hosting program 110-1 finds three computing devices in network 120, computing device A, computing device B, and computing device C. Hosting program 110-1 uses an algorithm to compare the average exit time, the amount of available space, and remaining battery power about each computing device. Hosting program 110-1 selects computing device B as the host based on the algorithm. Hosting program 110-1 chose computing device B in the background without communicating or interacting with the user of computing device 101-1, computing device A, computing device B, or computing device C. In an embodiment, hosting program 110-1 automatically selects a host computing device for shared content when hosting program 110-1 receives input from a user to find a host computing device.

In an alternative embodiment, if hosting program 110-1 does not receive a response from a potential host computing device, hosting program 110-1 continues to send a request until either hosting program 110-1 locates a host (e.g., every 60 seconds) or the computing device 101-1 of the shared content leaves the network. In an embodiment, if hosting program 110-1 does not locate a host, the shared content is no longer available to any computing device in network 120 upon the exit of owning computing device from network 120.

If hosting program 110-1 did not receive a response from a potential host device (decision block 245, no branch), hosting program 110-1 determines if shared content was received (decision block 260). In other words, hosting program 110-1 determines if the shared content that hosting program 110-1 indicated it could host in step 240 has been received. In an embodiment, hosting program 110-1 determines if computing device 101-1 received the shared content of computing device 101-2 by searching information repository 114-1 of computing device 101-1. For example, hosting program 110-1 searches information repository 114-1 of computing device 101-1 for content that contains metadata that identifies the content as content that is owned by and shared by computing device 101-1.

If hosting program 110-1 determines that computing device 101-1 received the shared content (decision block 260, yes branch), hosting program 110-1 stores the shared content in information repository 114-1 of computing device 101-1 (step 265). In an embodiment, the shared content may come from computing device 101-2, computing device 101-n, or any other computing device accessible via network 102.

If hosting program 110-1 determines that the shared content was not received (decision block 260, no branch), hosting program 110-1 determines if a request to end hosting was received (decision block 270). In an embodiment, hosting program 110-1 determines if a request to end hosting was received by analyzing incoming input.

If hosting program 110-1 determines that a request to end hosting was received (decision block 270, yes branch), hosting program 110-1 removes the shared content from information repository 114-1 (step 275). For example, hosting program 110-1 is hosting the shared content of computing device 101-2 on computing device 101-1. Computing device 101-2 leaves network 120 after computing device 101-1 receives the shared content of computing device 101-2. Upon computing device 101-2 reconnecting to network 120, hosting program 110-2 sends a request to hosting program 110-1 for computing device 101-1 to end the hosting of the shared content of computing device 101-2. If hosting program 110-1 receives the request to end hosting, hosting program 110-1 removes the shared content of computing device 101-1 from information repository 114-1. In an embodiment, hosting program 110-1 removes the shared content from information repository 114-1 to prevent duplication.

If hosting program 110-1 determines that a request to end hosting was not received (decision block 270, no branch), hosting program 110-1 determines if UI input to end application was received or if a lost connection occurred (decision block 280). Processing ends hosting program 110-1 receives input to end or a lost connection occurs. If hosting program 110-1 determines that UI input to end application was not received or that a lost connection did not occur (decision block 280, no branch), processing continues back to step 220. If hosting program 110-1 determines that UI input to end application was received or that a lost connection occurred (decision block 280, yes branch), processing ends.

In an example, computing device A connects to network 120. Once connected to network 120, hosting program A determines if computing device A shared content with a host computing device during a previous connection to network 120. Hosting program A searches repository A for retained information that would indicate if content was shared during a previous connection. Hosting program A determines that computing device A did share content with a host during a previous connection to network 120. Hosting program A broadcasts a request to end hosting the computing device(s) hosting the shared content of computing device A. The hosting program(s) of the host computing device(s) receives the request to end hosting. The respective hosting program of the host computing device(s) removes the shared content from the repositories of the host computing device(s).

In another example, computing device A connects to network 120. Once connected, hosting program A monitors network 120 for UI input or network data. The user of computing device A is sharing content with computing devices within network 120. The user of computing device A wants to leave network 120 but wants the shared content to remain visible to computing devices within network 120. The user of computing device A, via UI A, sends input to hosting program A to find a computing device, within network 120, to host the shared content belonging to computing device A. Hosting program A sends a request to the computing devices within network 120 requesting a host to host the shared content of computing device A.

There are a total of five computing devices in network 120 when hosting program A requests a host, including computing device A. The computing devices in network 120 are computing device A, computing device B, computing device C, computing device D, and computing device E. Hosting program A receives a response from computing device B, computing device C, and computing device E, respectively, indicating the computing device can host content. Hosting program A uses an algorithm to determine which of the three computing devices will be the best host, using information about each device. Hosting program A takes into account, the average length of time each device remains in network 120, the average exit time of each computing device, the amount of storage available for hosting, the remaining battery life of each computing device, and the strength of the connection of the devices to network 120. The average exit time of the computing devices is the primary factor hosting program A takes into account when determining a host to host the shared content. The user of computing device A sent the request for a host to hosting program A at noon. The user of computing device A plans to leave network 120 with computing device A at 12:00 PM. The average exit time of computing device B is 3:30 PM. The average exit time of computing device C is 9:00 PM. The average exit time of computing device E is 6:00 PM. Since computing device C has the latest average exit time, hosting program A selects computing device C as the host to host the shared content of computing device A.

Hosting program A sends the shared content of computing device A to computing device C. Hosting program C stores the shared content to repository C of computing device C. At 5:00 PM, computing device A returns to network 120. Computing device C is still hosting the shared content of computing device A. Hosting program A detects that computing device C is hosting the shared content of computing device A. To prevent duplication of the shared content (the visibility of the same content in more than one location, which results in the multiple viewings of the content), hosting program A sends a request to end hosting to hosting program C. When hosting program C receives the request to end hosting, hosting program C removes the shared content from repository C.

Figure 3:
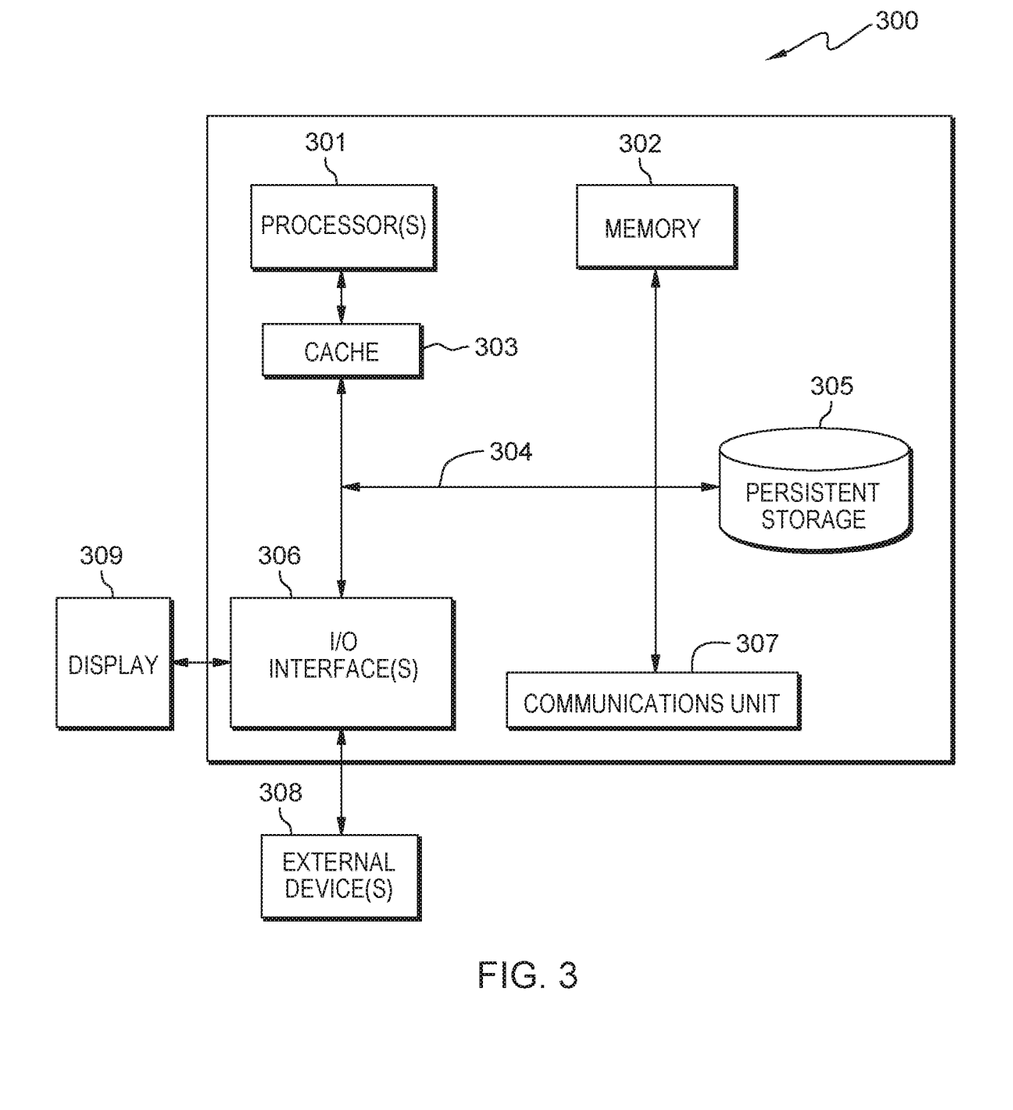
FIG. 3 depicts a block diagram of components of the computing device of FIG. 1, in accordance with an embodiment of the present invention.

FIG. 3 depicts computer system 300, which is an example of a system that includes hosting program 110-1. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for a hosting program extending the availability of shared content, the computer program product comprising:
   one or more computer readable storage media; and
   program instructions stored on the one or more computer readable storage media, the program instructions comprising:
   program instructions to receive an indication to determine a device to host at least one shared content found on a first device, wherein the first device is connected to a network, and wherein the network includes two or more devices;
   program instructions to transmit to each device of the two or more devices connected to the network, a request to host the at least one shared content found on the first device;
   program instructions, responsive to transmitting the request, to receive a response to host from at least one device of the two or more devices connected to the network;
   program instructions to determine an optimal device of the at least one device to host the at least one shared content; and
   program instructions to transmit the at least one shared content to the optimal device.

2. The computer program product of claim 1, wherein the program instructions to determine the optimal device of the at least one device to host the content comprises:
   program instructions, responsive to determining that a response to host was received from only one device, to determine an optimal device is the one device.

3. The computer program product of claim 1, wherein the program instruction to determine an optimal device of the at least one device to host the content comprises:
   program instructions, responsive to determining that a response to host was received from two or more devices, to determine data about the two or more devices, wherein the data is selected from a group consisting of an amount of a battery life of each computing device of the two or more computing devices, an average time each computing device of the two or more computing devices exits the network, and an average amount of time each computing device of the two or more computing devices remains in the network; and
   determine an optimal device from the two or more devices based on the data.

4. The computer program product of claim 1, wherein the network is a mobile ad hoc network.

5. The computer program product of claim 1, further comprising program instructions, stored on the one or more computer readable storage media, to:
   receive an indication from a second device of the two or more computing devices to host a second at least one shared content;
   responsive to receiving the indication to host the second at least one shared content, sending, by one or more processors, a response to the second device that the first device can host the second at least one shared content;
   receive the second at least one shared content; and
   store the second at least one shared content, wherein the second at least one shared content is visible to other devices connected to the network.

6. The computer program product of claim 1, further comprising program instructions, stored on the one or more computer readable storage media, to:
  determine whether the first device has previously shared at least one shared content that is being hosted by any device of the two or more devices connected to the network; and
  responsive to determining the first device has previously shared at least one shared content that is being hosted by any device of the two or more devices connected to the network, indicate to each device of the two or more devices hosting the at least one shared content to remove the at least one shared content.

7. The computer program product of claim 1, wherein each device of the two or more devices is a mobile device.

8. A computer system for a hosting program extending the availability of shared content, the computer system comprising:
  one or more computer processors;
  one or more computer readable storage media; and
  program instructions stored on the one or more computer readable storage media for execution by at least one of the one or more processors, the program instructions comprising:
  program instructions to receive an indication to determine a device to host at least one shared content found on a first device, wherein the first device is connected to a network, and wherein the network includes two or more devices;
  program instructions to transmit to each device of the two or more devices connected to the network, a request to host the at least one shared content found on the first device;
  program instructions, responsive to transmitting the request, to receive a response to host from at least one device of the two or more devices connected to the network;
  program instructions to determine an optimal device of the at least one device to host the at least one shared content; and
  program instructions to transmit the at least one shared content to the optimal device.

9. The computer system of claim 8, wherein the program instruction to determine the optimal device of the at least one device to host the content comprises:
  program instructions, responsive to determining that a response to host was received from only one device, to determine an optimal device is the one device.

10. The computer system of claim 8, wherein the program instructions to determine an optimal device of the at least one device to host the content comprises:
  program instructions, responsive to determining that a response to host was received from two or more devices, to determine data about the two or more devices, wherein the data is selected from a group consisting of an amount of a battery life of each computing device of the two or more computing devices, an average time each computing device of the two or more computing devices exits the network, and an average amount of time each computing device of the two or more computing devices remains in the network; and
  determine an optimal device from the two or more devices based on the data.

11. The computer system of claim 8, wherein the network is a mobile ad hoc network.

12. The computer system of claim 8, further comprising program instructions, stored on the computer readable storage media for execution by at least one of the one or more processors, to:
  receive an indication from a second device of the two or more computing devices to host a second at least one shared content;
  responsive to receiving the indication to host the second at least one shared content, sending, by one or more processors, a response to the second device that the first device can host the second at least one shared content;
  receive the second at least one shared content; and
  store the second at least one shared content, wherein the second at least one shared content is visible to other devices connected to the network.

13. The computer system of claim 8, further comprising program instructions, stored on the computer readable storage media for execution by at least one of the one or more processors, to:
  determine whether the first device has previously shared at least one shared content that is being hosted by any device of the two or more devices connected to the network; and
  responsive to determining the first device has previously shared at least one shared content that is being hosted by any device of the two or more devices connected to the network, indicate to each device of the two or more devices hosting the at least one shared content to remove the at least one shared content.

* * * * *